FIG. I

INVENTORS
NORMAN S. ROBSON &
CHARLES B. GORDON

INVENTORS
NORMAN S. ROBSON &
CHARLES B. GORDON

March 20, 1962 N. S. ROBSON ETAL 3,025,929
FLUID DISTRIBUTOR MEANS
Filed April 4, 1960 7 Sheets-Sheet 5

INVENTORS
NORMAN S. ROBSON &
CHARLES B. GORDON

United States Patent Office 3,025,929
Patented Mar. 20, 1962

3,025,929
FLUID DISTRIBUTOR MEANS
Norman S. Robson and Charles B. Gordon, Cleveland, Ohio, assignors to Trabon Engineering Corporation, Solon, Ohio, a corporation of Ohio
Filed Apr. 4, 1960, Ser. No. 19,677
3 Claims. (Cl. 184—7)

This invention relates to divisional feeders for automatic lubricating systems in which a lubricating medium is transmitted from a central station to a plurality of lubricating distant therefrom, such as bearings.

A general object of the invention is to improve on lubricating devices of this type. It has been proposed in U.S. Patent No. 2,834,433 to provide a divider comprising an assemblage of a number of double acting piston devices, the assemblage comprising an indefinite number of so-called "intermediate pistons" which are ported so that upon movement of each intermediate piston by lubricant under pressure applied to the appropriate end, the supply of lubricant is then directed to the same end of the next piston in sequence. The sequence is followed from one to the other of such pistons and then reversal is effected by a pair of so-called "end piston devices" which interact in a manner to initiate the application of lubricant pressure successively to the opposite ends of the above mentioned so-called intermediate pistons.

Such dividers have encountered considerable trouble in attempted field operation. Extremely high pressure losses are experienced from the input side to the various supply lines and there is frequently a tendency of the dividers to "hang up" and present an apparent block or absolute stoppage at the inlet line or, alternatively, to cause severe pressure losses between the inlet header and the outlet branch passages.

The general object of the present invention is to greatly improve the reliability of dividers employing the series of such so-called "intermediate" pistons.

Another object of the invention in one of its important aspects is to provide a divider of the type employing a series of such so-called intermediate pistons in which any back pressure in the outlet branch passages of the divider and in the piston chambers supplying such outlet branch passages is counteracted by equally pressurized lubricant within the opposed piston chambers so as to prevent improper positioning of the pistons or improper proportioning of the fluid among the several outlet branch passages.

It will be understood in the below description that the output from both ends of any one valve-and-plunger unit may be conducted to a single lubricating point if desired and that the output from the same end of two or more successively acting valve-and-plunger units may be delivered to a single lubricating point if desired. The source of supply of lubricant may be an intermittently operating grease gun or the like but usually will be a continuously operating lubricant pump or the like, or it may be the delivery point of another lubricating system of the same or different general type. Similarly, any delivery point in the present system may be the source of supply for a subsidiary sub-dividing system.

Examples of the invention are illustrated in the accompanying drawings, in which.

Figure 1:
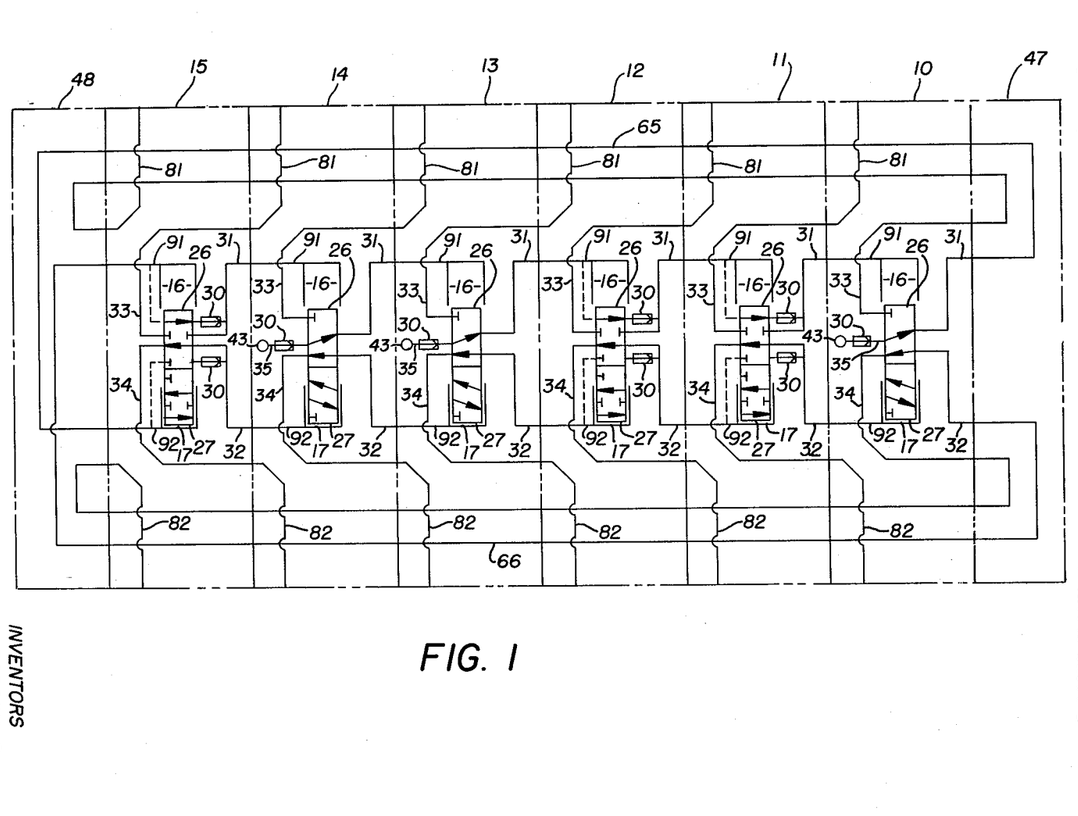
FIGURE 1 is an abstract and schematic view of a fluid divider employing the invention.

*Apparatus of FIGURE 1*

Figure 16:
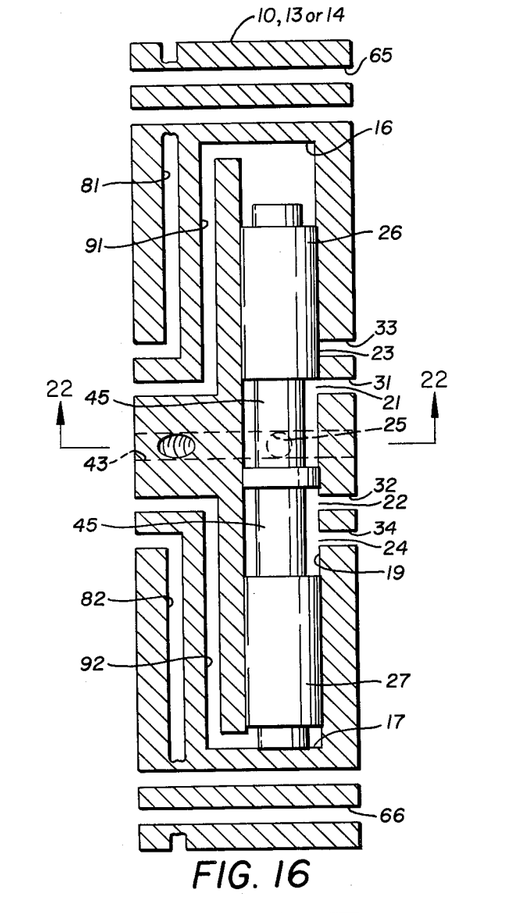
FIGURE 16 is a diagrammatic view of the structure of a valve-and-plunger unit representing one or all of the blocks 10, 13 or 14 in FIGURE 1; with suffixation of the letter "a" to each of its reference characters, FIGURE 16 could also represent one or all of the valve-and-plunger units 10a—12a in FIGURE 2; and with suffixation of the letter "b" to each of its reference characters, FIGURE 16 could also represent one or all of the valve-and-plunger units 11b, 13b or 15b in FIGURE 3.
Figure 18:
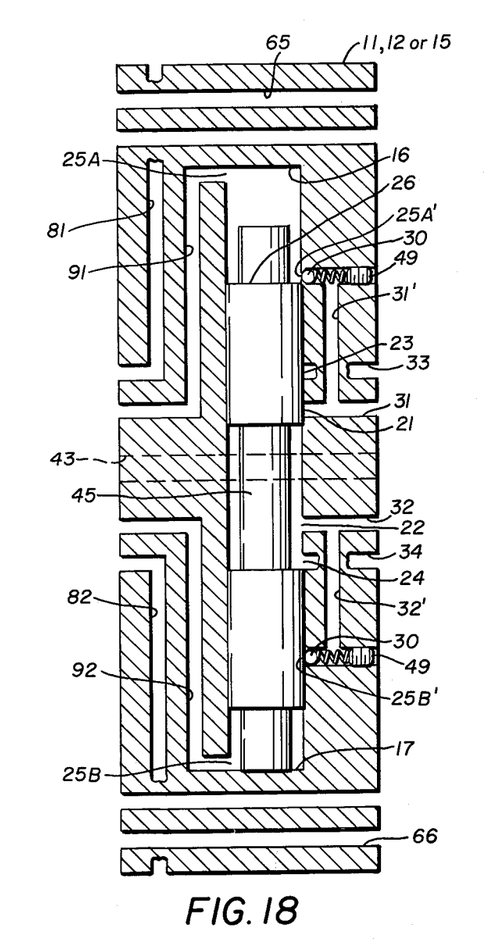
FIGURE 18 is a diagrammatic view of the structure of a valve-and-plunger unit representing one or all of the blocks 11, 12 or 15 in FIGURE 1; with suffixation of the letter "a" to each of the reference characters, FIGURE 18 could also represent one or all of the valve-and-plunger units 13a—15a in FIGURE 2; and with suffixation of the letter "b" to each of its reference characters, FIGURE 18 could also represent one or all of the valve-and-plunger units 10b, 12b, 14b in FIGURE 3.
Figure 21:
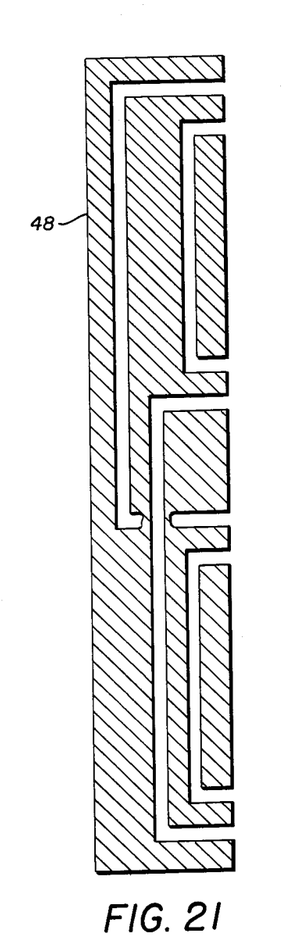
FIGURE 21 is a diagrammatic view of the structure of an end cap, such as the end cap 48, shown in FIGURE 1.

Shown in FIGURE 1 is a divider comprising the valve-and-plunger units 10—15 and further comprising the inlet end block 47 and the end block 48. The blocks 10, 13 and 14 are also illustrated in FIGURE 16. The blocks 11, 12 and 15 are also illustrated in FIGURE 18. Running through the inlet end block 47 and through each of the blocks 10–15 is a fluid supply header 43. For clarity of the drawings, the fluid supply header 43 is not indicated in FIGURE 1 as passing through the inlet end block 47 and the blocks 10–15 but is indicated as originating at a circle labeled 43 in certain of the blocks. This is done for clarity in order to minimize crossing of the various lines shown in the drawings. This is the only such departure from a strict representation of the fluid network of the divider. However, it will be understood that the header 43 passes through the inlet end block 47 and all the blocks 10–15, but that in passing through the blocks 11, 12 and 15, the header does not communicate with any parts of the interior of these blocks. The header 43 does communicate with interior portions of the blocks 10, 13 and 14, such communication being through a passage 35 which opens to a port 25 to the bore 19 of each of such blocks. The fluid supply header 43 is closed off by the end cap 48 as may be most clearly seen in FIGURE 21 where the end cap 48 is seen not to contain a continuation of the header 43.

The divider illustrated in FIGURE 1 comprises three valve-and-plunger units 10, 13 and 14 of a first type, to be described below, and in the particular apparatus described there are provided three valve-and-plunger units 11, 12 and 15 of a second type, to be described below. In the practice of the invention there will in all events be employed at least three valve-and-plunger units of the first type and at least one valve-and-plunger unit of the second type.

The valve-and-plunger units of both the first and second types each have a first hydraulic piston chamber 16 and a second hydraulic piston chamber 17. A pair of hydraulic pistons 26, 27 is each received in its own one of said pair of chambers 16, 17 in lubricant sealing sliding relationship therewith. Each valve-and-plunger unit includes linkage means such as stem means 45 (FIGURES 16–19) for linking the first and second pistons 26 and 27 together for movement in hydraulic opposition to each other back and forth between first and second limiting end positions. Each valve-and-plunger unit includes valve means associated for movement with the linkage means and the pair of hydraulic pistons. Such valve means may be in the form of various lobes which register in different ways with valve ports opening into the bore 19 in which the hydraulic pistons and the remainder of the structure may be received.

In the illustrated valve-and-plunger units, the valve means has associated therewith first valve port means 21, second valve port means 22, third valve port means 23 and fourth valve port means 24. In the illustrated structure and in the case of valve-and-plunger units of both the first and second types, all of the valve port means 21–24 are single ports.

In the valve-and-plunger units of the first type, 10, 13 and 14, the fifth valve port means also comprises a single port 25; while in the valve-and-plunger units of the second type, 11, 12 and 15, the fifth valve port means comprises a pair of ports 25A and 25B.

Figure 17:
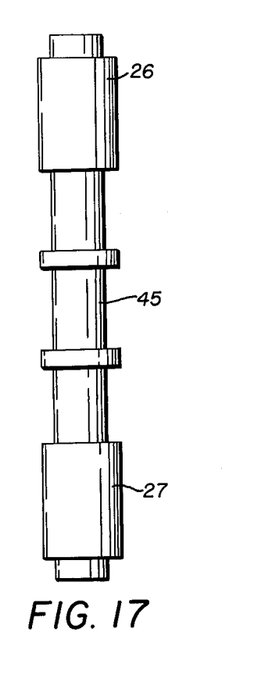
FIGURE 17 is an alternate form of plunger which can replace the plunger shown in FIGURE 16 to convert that unit from the porting relationships illustrated in FIGURE 4 (or 8 or 12) to the porting relationships illustrated in FIGURE 5 (or 9 or 13).

Even though the ports 25A and 25B are not directly blocked by the hydraulic pistons or other portions of the plunger structure at any time during the operation of the apparatus, it will be understood that they are truly ports in the same sense as, for example, the ports 23 and 24 of FIGURE 16 are truly ports even when the plunger of FIGURE 17 is employed in the blocks shown in FIGURE 16 whereby the port 24, for example, would be isolated from all other ports by the lower small land of the plunger of FIGURE 17 at the lowermost position of the plunger. In such situation the port 24 is not directly blocked by any portion of the peripheries of the plunger or lands, but nevertheless the port 24 will be understood to be blocked from the port 22 to which it is subsequently to be connected by shifting of the plunger unit. In the same sense, the ports 25A and 25B in the blocks 11, 12 and 15 of the second type are blocked from communicating through their associated chambers 16 or 17 and through supplemental ports 25A' or 25B' and connecting passages 31' or 32' with the ports 21 or 22 at all times except when their associated plunger 26 or 27 is removed as far or almost as far as possible from the ports 25A or 25B so as to expose the supplemental ports 25A' or 25B'. It will be seen in the case of each of the valve-and-plunger units 10–15 that the first valve port means 21 and the fifth valve port means 25 (or the pair of ports 25A and 25B taken together as a class comprising the fifth valve port means) and the second valve port means 22 and the fourth valve port means 24 are interconnected when a first limiting end position obtains but not when the opposite second limiting end position obtains. It will also be seen that conversely the first valve port means 21 and the third valve port means 23 are interconnected and the second valve port means 22 and the fifth valve port means 25 (or 25A and 25B taken together as a class) are interconnected when such second limiting end position obtains but not when such first limiting end position obtains.

Examples of valve-and-plunger units of the first type mentioned above are found in U.S. Patent 2,792,911 to Harter. Examples of valve-and-plunger units of both types mentioned above are found in U.S. Patent 2,834,433 to Higgins who teaches the provision of an indefinite number of blocks of the second type forming a double series of chambers of indefinite extent, transfer from one series to the other being accomplished by a pair of end blocks of the first type.

The literal use of the same number of valving lobes and the like as shown in FIGURES 16–19 is not strictly necessary. For example, in the block of FIGURE 18, the chambers 16 and 17 might constitute merely valving chambers similar to the chamber surrounding the central stem 45 and more remote chambers outboard of the chambers 16 and 17 might be employed to receive end plungers. Thus the ports 25A and 25B together with the auxiliary ports 25A' and 25B' would be connected and disconnected precisely in the way that for example, ports 22 and 24 are in the block of FIGURE 16 when the plunger of FIGURE 17 is substituted therein. This is another demonstration that the ports 25A and 25B are truly ports even though they are not directly blocked by the hydraulic pistons or other portions of the plunger structure any time during the operation of the apparatus.

Figure 19:
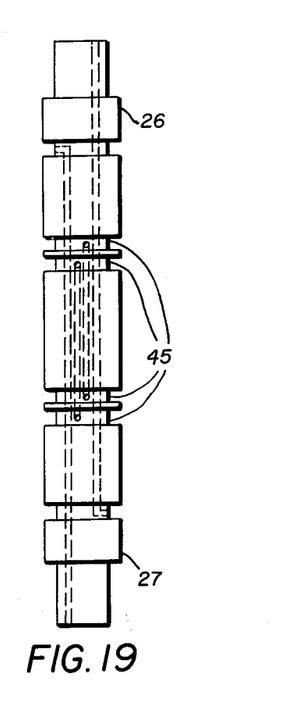
FIGURE 19 is an alternate form of plunger which can replace the plunger shown in FIGURE 18 to convert that unit from the porting relationships illustrated in FIGURE 6 (or 10 or 14) to the porting relationships illustrated in FIGURE 7 (or 11 or 15).
Figure 20:
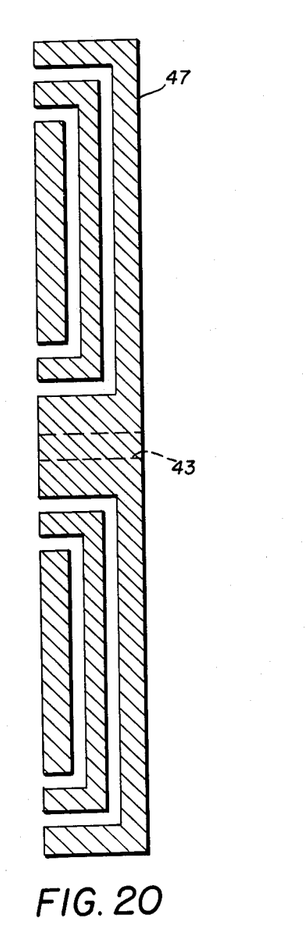
FIGURE 20 is a diagrammatic view of the structure of an inlet cap, such as the inlet cap 47 shown in FIGURE 1.

The porting of the block in FIGURE 18 using either the plunger illustrated therein or the plunger of FIGURE 19, and also the above-mentioned possible use of the chambers 16 and 17 (with supplemental piston chambers added) solely as valving chambers, would all be precisely in accord with the porting relationships called for by the diagrammatic representations of FIGURES 1–3 and 4–15 where, in the valves of the second type, the dotted lines between the lines 91a and ports 25A and between the lines 91b and the ports 25B illustrate the relationship of communication between the respective lines 91a and 91b and ports 25A and 25B in either case.

Each of the valve-and-plunger units 10–15 has first, second, third, and fourth passages numbered 31–34, respectively, communicating respectively with the first, second, third and fourth valve port means 21–24. Each of the valve-and-plunger units also has first and second in-out lines 91 and 92 communicating respectively with the first piston chamber 16 and the second piston chamber 17 of each such unit. The third and fourth passages 33 and 34 of the valve port means constitute the upstream portions of outlet branch passages 33, 81 and 34, 82, the downstream portions thereof being comprised of the outlet branch passage extensions 81 and 82 which may be physically located in adjacent blocks. It will be understood that the outlet branch passage extensions 81 and 82 lead to the several outlet branch lines which communicate with the bearings to be lubricated or which may communicate with a subsidiary sub-dividing system.

Figure 22:
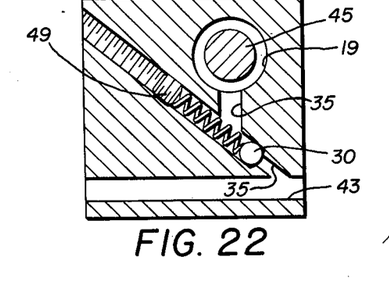
FIGURE 22 is a transverse cross-section of the block shown in FIGURE 16.

As previously mentioned, the fifth valve port means of each of the valve-and-plunger units 10, 13 and 14 which are of the first type comprises a port 25 communicating with the fluid supply header 43 through the passage 35 (FIGURE 22). In the valve-and-plunger units 11, 12 and 15 of the second type, the fifth valve port means comprises the pair of fifth valve ports 25A and 25B. A first of such pair of fifth valve ports (25A in FIGURE 18) communicates with the first in-out line 91. The second of the pair of fifth valve ports (25B in FIGURE 18) communicates with the second in-out line 92.

Figure 5:
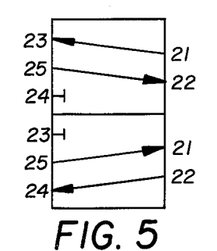
Figure 6:
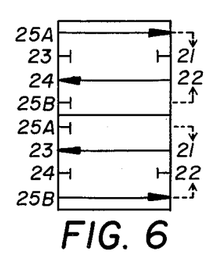
Figure 7:
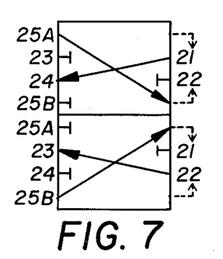
Figure 8:
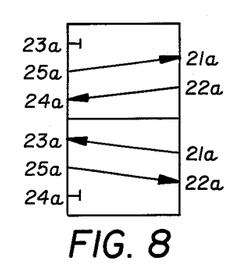
FIGURES 8–11 are enlarged diagrammatic representations of the porting of valves as employed, or as capable of being employed, in the apparatus of FIGURE 2.
Figure 9:
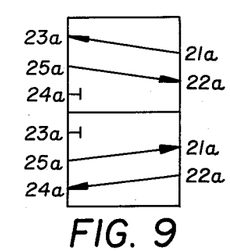
Figure 10:
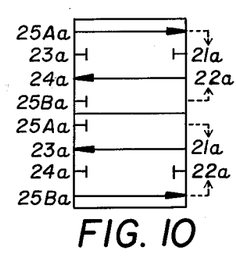
Figure 11:
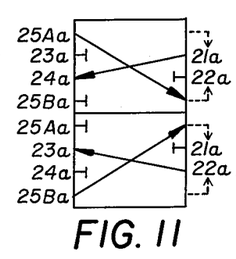
Figure 12:
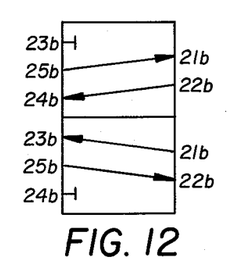
FIGURES 12–15 are enlarged diagrammatic representations of the porting of valves as employed, or as capable of being employed, in the apparatus of FIGURE 3.
Figure 13:
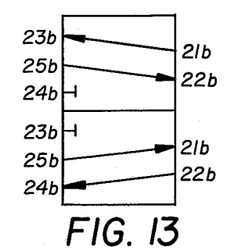
Figure 14:
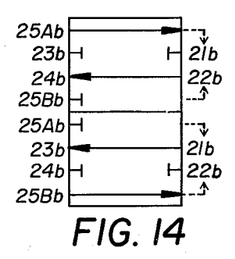
Figure 15:
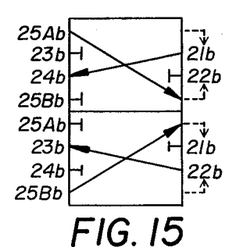

In the divider illustrated in FIGURE 1, none of the valve-and-plunger units are of the alternative porting type which would result, for example, from substituting the plungers of FIGURES 17 and 19 for those in the blocks shown in FIGURES 16 and 18. However, the system is rendered operative by a cross-over of the connection between the first and second passages 31 and 32 of the endmost valve-and-plunger unit 10 and the first and second in-out lines 91 and 92 of the other endmost valve-and-plunger unit 15, such cross-over being effected in the end block 48. However, if desired, such cross-over can be eliminated provided an odd number of the valve-and-plunger units are arranged to be ported as shown in FIGURE 5 in the case of the valve-and-plunger units of the first type or as shown in FIGURE 7 in the case of the valve-and-plunger units of the second type, or alternatively the cross-over as illustrated can be maintained and an even number of the valve-and-plunger units of FIGURE 1 can be changed from the porting arrangements shown in FIGURES 4 or 6 to the porting arrangement shown in FIGURES 5 or 7. Other combinations may be employed provided the total of the line crossovers and the total of the porting arrangements of the kind shown in FIGURES 5 or 7 equal a grand total that is an odd number.

The present invention includes the important appreciation that provision of at least three valve-and-plunger units of the above-mentioned first type will avoid the extremely high pressure losses or tendency of the divider to "hang up" which have been previously encountered in those dividers combining valve-and-plunger units of the first and second types, described above.

In another important aspect the invention involves the accomplishment of a balancing of back pressure which may be imposed from the outlet branch lines so as to cause false operation of the valve-and-plunger units. This trouble is particularly likely to occur if air bubbles are trapped in the outlet branch lines under high pressure and may result in out-of-sequence operation or improper proportioning of fluid among the several delivery points. To this end there are provided one-way flow imposing means such as check valves 30 in each of the fifth passages 35 of the valve-and-plunger units 11, 12 and 15 of the first type. Such check valves 30 may be actuated by springs as shown, the springs being retained by appropriate plugs or screws such as the elements 49.

In an additional important aspect of the invention, there may be provided additional one-way flow imposing means such as additional check valves 30 associated with the valve blocks of the second type, 10, 13 and 14, and interposed in the path of communication between the pair of valve ports 25A and 25B and the one of the first and second valve port means 21 and 22 to which such ports 25A and 25B become interconnected in the course of the operation of the valve means. Thus, the valve-and-plunger units of FIGURE 18 illustrate a check valve 30 interposed between the valve port 25A and the port 21 and also between the valve port 25B and the port 22, such check valves being located immediately beyond the ports 25A' and 25B'.

By way of an alternative example, the check valves 30 could be interposed between the valve port 25A and the port 21 and also between the valve port 25B and the valve port 22 by inserting a ball check endwardly within the two laterally outermost longitudinally extending drilled passages shown in the plunger of FIGURE 19, to thereby restrict flow in the lefthand laterally outermost longitudinally extending drilled passage in FIGURE 19 to flow in the upward direction and restrict flow in the righthand laterally outermost longitudinally extending drilled passage in FIGURE 19 to flow in the downward direction.

The positive imposition of one-way flow at these critical locations within the valve blocks of the second type are believed to function to prevent the backward discharge of fluid from one, or more critically, from a series of interconnected chambers 16 or 17 of such valve blocks of the second type.

Operation of Apparatus of FIGURE 1

Fluid admitted from header 43 in block 10 passes through the following elements of block 10: 35, 30, 25, 21, 31. It thereupon passes through the connecting line of inlet end block 47 down the illustrated connecting line 65 extending along the side of the assembly and through the crossed-over connecting line of end block 48 to line 92 of block 15 and into chamber 17 of block 15. The piston 27 of block 15 is thereby forced upwardly. Fluid is expressed out of chamber 16 of block 15 and passes out line 91 of block 15 through the crossed-over connection in block 48 and down the illustrated connecting line 66 extending along the side of the assembly through the corresponding connection in block 47 and thence through the following elements in block 10: 32, 22, 24, 34. Such fluid continues from line 34 of block 10 back through cap 47 and along the illustrated but unnumbered connecting line extending along the assembly of blocks to and through cap 48 and out line 82 of block 15.

Meanwhile port 25B (see FIGURE 6) of block 15 becomes connected to port 22 thereof through check valve 30 and correspondingly becomes connected to line 32 of block 15. Fluid thereby flows from chamber 17 through line 32 of block 15 and then through line 92 of block 14 to fill chamber 17 of block 14. Fluid is correspondingly expressed from chamber 16 of block 14 to line 91 thereof and through the following elements of block 15: 31, 21, 23, 33. Finally the fluid moves outwardly through element 81 of block 14.

Meanwhile port 25 of block 14 becomes connected to port 22 thereof and fluid is admitted from header 43 through the following elements of block 14: 35, 30, 25, 22, 32. Such fluid passes through line 92 of chamber 17 of block 13 moving the piston 26 upwardly and expressing fluid from chamber 16 of block 13. Such fluid passes out line 91 of block 13 and then through the following elements of block 14: 31, 21, 23, 33. Finally such fluid passes out of line 81 of block 13.

Meanwhile, port 25 of block 13 becomes connected to port 22 thereof. Fluid from the header 43 is then admitted through the following elements of block 13: 35, 30, 25, 22, 32. Such fluid then passes to line 92 of block 12 causing the chamber 17 to fill and raising the piston 26 to express fluid from the chamber 16. Such expressed fluid passes out the ine 91 of block 12 and then through the following elements of block 13: 31, 21, 23, 33. Such fluid then passes out of line 81 of block 12.

Meanwhile port 25B of block 12 becomes connected through check valve 30 to port 22 thereof and thereby to line 32 thereof whereby fluid is admitted through such connection to line 92 of block 11 causing chamber 17 of block 11 to fill and thus raising the piston 26 of block 11 to express fluid from chamber 17 of block 11. Such fluid passes out of line 91 of block 11 and then through the following elements of block 12: 31, 21, 23, 33. Finally such fluid passes out of line 81 of block 11.

Meanwhile port 25B of block 11 becomes connected through intervening check valve 30 to port 22 thereof and thus to line 32 whereby fluid is admitted therethrough from the chamber 17 of block 11 through line 92 of block 10 to the chamber 17 of block 10. Piston 26 of block 10 is raised expressing fluid out of line 91 of block 10 and through the following elements of block 11: 31, 21, 23, 33. Finally such fluid passes out of line 81 of block 10.

Meanwhile port 25 of block 10 becomes connected to port 22 thereof and fluid admitted through the header 43 passes through the following elements of block 10: 35, 30, 25, 22, 32, and then through the inlet end block 47 and then through the passage 66 and then through the cross-over connection of block 48 and finally through line 91 of block 15 into chamber 16 of block 15 to cause the piston 27 of bloc k15 to shift back down to the illustrated position. Fluid is thereby expressed from the chamber 17 of block 15 through the crossed-over connection of end block 48 and through the lines 65 and the corresponding connection of block 47 to line 31 of block 10 and then through the following elements of block 10: 21, 23, 33. Such fluid then passes through the corresponding connection in block 47 and corresponding connecting line through the stack of blocks 10–15 and the connection of block 48 to and through line 81 of block 15.

Meanwhile the port 25A of block 15 becomes connected through the intervening check valve 30 to the port 21 and thus to the line 31 of block 15 and finally to the line 91 of block 14 and the chamber 16 of block 14 causing such chamber 16 to fill and forcing the plunger 27 to the illustrated lowermost position, thereby expressing fluid from the chamber 17 of block 14 through the line 92 of block 14 and through the following elements of block 15: 32, 22, 24, 34 and finally through line 82 of block 14.

Meanwhile port 25 of block 14 becomes connected to port 21 and fluid admitted from header 43 passes through the following elements of block 14: 35, 30, 25, 21, 31. Such fluid is admitted through line 91 of block 13 into chamber 16 thereof forcing the plunger 27 to the lowermost illustrated position and thereby expressing fluid from chamber 17 of block 13 through the following elements of block 14: 32, 22, 24, 34. Finally such fluid passes out through line 82 of block 13.

Meanwhile port 25 of block 13 becomes connected to port 31 of block 13. Fluid from the header 43 then passes through the following elements of block 13: 35, 20, 25, 21 and finally to line 91 of block 12 and the chamber 16 of block 12 causing the chamber plunger 27 to move to the illustrated lowermost position thereby expressing fluid from chamber 17 through line 92 of block 12 and through the following elements of block 13: 32, 22, 24, 35. Such fluid then passes out line 82 of block 12.

Meanwhile port 25A of block 12 becomes connected through intervening check valve 30 to port 21 of block 12 and thereby to line 31 of block 12 and fluid passes therethrough into line 91 of block 11 and into chamber 16 thereof causing the plunger 27 of block 11 to move downwardly expressing fluid from chamber 17 of block 11 out of line 92 and through the following elements of block 12: 32, 22, 24, 34. Such fluid then passes out of line 82 in block 11.

Meanwhile port 25A of block 11 becomes connected through intervening check valve 30 to port 21 thereof and thus to line 31 of block 11 whereby fluid flows into line 91 of block 10 and into chamber 16 of block 10. The plunger 27 of block 10 is thus forced to the lowermost position expressing fluid from chamber 17 out line 92 of block 10 and through the following elements of block 11: 32, 22, 24, 34. Such fluid then passes out line 82 of block 10.

Meanwhile port 25 of block 10 becomes connected to port 21 thereof and the above described cycle repeats itself.

Figure 2:
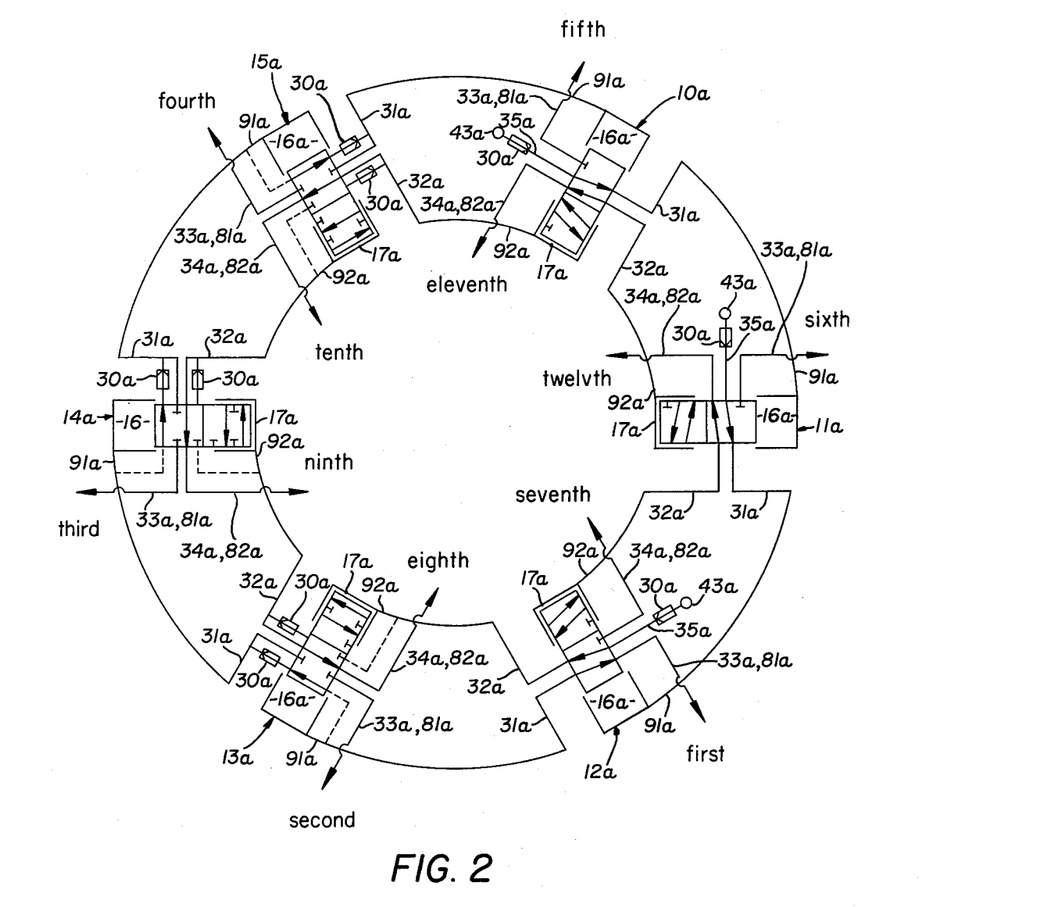
FIGURE 2 is an abstract schematic view of another fluid divider embodying the invention and in which the valve-and-plunger units are not necessarily oriented in the form of a series of stacked blocks.

*Apparatus of FIGURE 2*

Another illustration of the invention is shown in FIGURE 2. Here valves and conduits such as those previously described are illustrated in an array which is literally circular. In each instance, identical or equivalent elements in this illustration of the invention are given the same reference numeral as those previously given with the addition of the lower-case letter "a." FIGURE 2 is to be taken together with FIGURES 8–11 which are enlarged diagrammatic representations of the porting of the valves which may be employed in the apparatus of FIGURE 2.

In the apparatus of FIGURE 2 there are again employed six valve-and-plunger units 10a–15a. It will be understood that this number may vary from four upwardly to an indefinite number of valve-and-plunger units but that in any case at least three valve-and-plunger units of the first type and one of the second type must be employed; and it will be seen in the particular apparatus illustrated that three successive valve-and-plunger units 10a–12a are of the above described first type in which the fifth valve port means comprises a fifth valve port 25a (see FIGURES 8 and 9) communicating with the fluid supply header 43a. The remaining three successive valve-and-plunger units 13a–15a will be seen to constitute those of the second type in which the fifth valve port means comprises a pair of fifth valve ports 25Aa and 25Ba (see FIGURES 10 and 11) each communicating with one or the other of the in-out lines 91a or 92a.

In the divider illustrated in FIGURE 2, only one of the valve-and-plunger units is of the alternate porting type which results, for example, from the substitution of the plunger of FIGURES 17 and 19 for those in the blocks shown in FIGURES 16 and 18. Such one valve-and-plunger unit is the unit 12a. It will be seen that in units 10a, 11a, 13a–15a, the first and second valve port means 21a and 22a are connected to the fifth valve port means (comprising the single port 25a or comprising the pair of ports 25Aa and 25Ba) when the one of their first and second piston chambers 16a and 17a closest to the first and second valve port means 21a and 22a is filled. However, it will be seen that unit 12a is arranged in the opposite manner.

It will be seen that in the divider of FIGURE 2 there is no cross-over between the first and second passages 31a and 32a of any of the valve-and-plunger units 10a–15a and the first and second in-out lines 91a and 92a of adjacent units. The cross-over in the system is effected by the single alternate porting type valve in the unit 12a. However, if desired, the cross-over can be accomplished several times by either crossing the connection between the passage 31a and 32a and their respective in-out lines 91a and 92a or by using valves of the alternate porting type. For the system to be operative, it is necessary that such cross-overs total an odd number. Thus in FIGURE 2, it will be seen that one valve-and-plunger unit is crossed-over (the unit 12a) and none of the connections between lines 31a and 32a and lines 91a and 92a are crossed. One crossed valve and zero crossed lines makes a total of an odd number, namely one.

*Operation of Apparatus of FIGURE 2*

The operation of the apparatus of FIGURE 2 can be followed through similarly to the above-described particularization of the operation of the apparatus of FIGURE 1. With the several value-and-plunger units in the illustrated positions, the next plunger to move is that of the unit 13a and the first branch passage extension to receive a measure of lubricating fluid is the extension 81a of unit 12a, as indicated by the word "first" in FIGURE 2. In view of the preceding description of the FIGURE 1 apparatus, the operation of the remainder of the FIGURE 2 divider should be obvious and the order of discharge of lubricant from the several branch passage extensions 81a and 82a are indicated by the words "second" through "twelfth."

Figure 3:
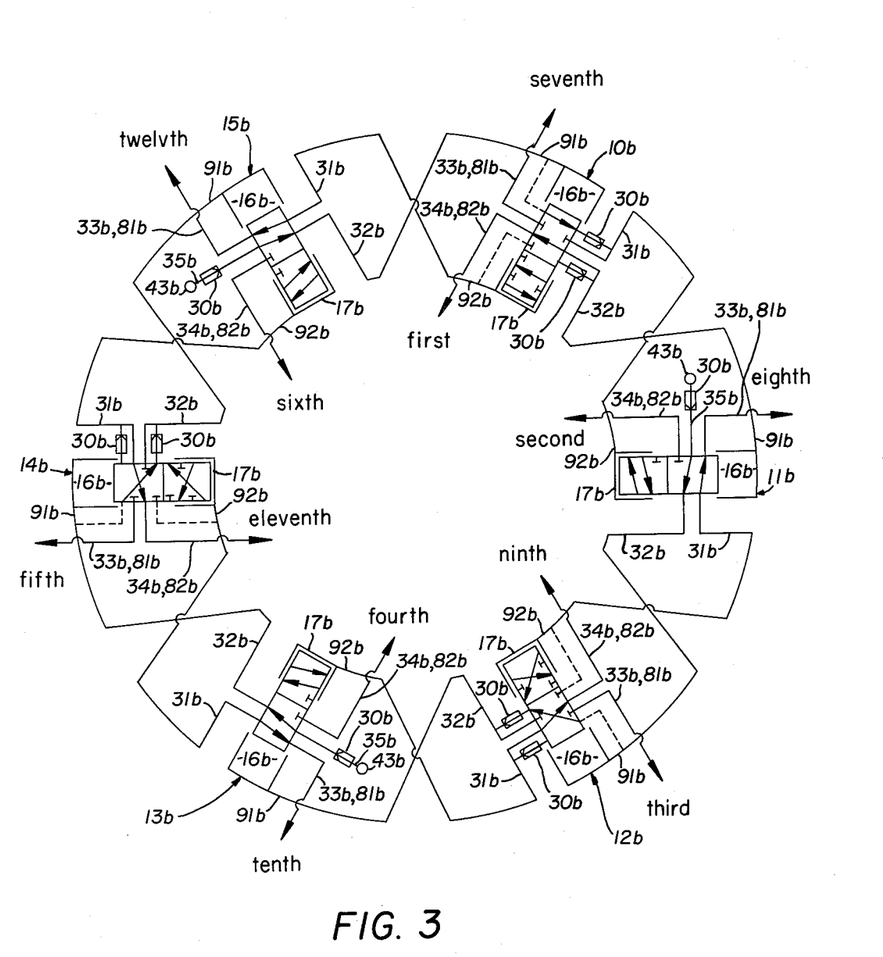
FIGURE 3 is a view similar to FIGURE 2 showing still another example of the invention.
Figure 4:
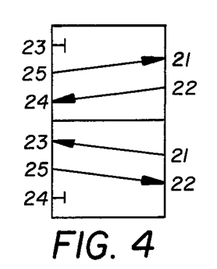
FIGURES 4–7 are enlarged diagrammatic representations of the porting of valves as employed, or as capable of being employed, in the apparatus of FIGURE 1.

*Apparatus of FIGURE 3*

Another illustration of the invention is shown in FIGURE 3. In this case elements identical or equivalent to those previously described are given the same reference numeral with the addition of the lower-case letter "b." FIGURE 3 is to be taken together with FIGURES 12–15 which are enlarged diagrammatic representations of the porting of the valves which may be employed in the apparatus of FIGURE 3.

In the apparatus of FIGURE 3 there are again employed six valve-and-plunger units 10b–15b. Again it will be understood that this number may vary from four upwardly to an indefinite number of valve-and-plunger units but that in any case, at least three valve-and-plunger units of the first type and one of the second type must be employed; and it will be seen that in the particular apparatus illustrated three valve-and-plunger units 11b, 13b and 15b are of the above-described first type in which the fifth valve port means comprises a fifth valve port 25b (see FIGURES 12 and 13) communicating with the fluid supply header 43b. In this illustrated apparatus each of the valve-and-plunger units of such first type is separated by a valve-and-plunger unit of the second type in which the fifth valve port means comprises a pair of fifth valve ports 25Ab and 25Bb communicating with one or the other of the in-out lines 91b and 92b.

In the divider illustrated in FIGURE 3, all of the valve-and-plunger units except one are of the alternate porting type which results, for example, from the substitution of the plungers of FIGURES 17 and 19 for those in the blocks shown in FIGURES 16 and 18; such single exception is the valve-and-plunger unit 10b. It will be seen that in the unit 10b the first and second valve port means 21b and 22b are connected to the fifth valve port means (comprising the single port 25b or comprising the ports 25Ab and 25Bb) when the one of their first and second piston chambers 16b and 17b closest to the first and second valve port means 21b and 22b is filled. However, it will be seen that units 11b–15b are arranged in the opposite manner.

It will be seen that in the divider of FIGURE 3, there are cross-overs between the first and second passages 31b and 32b of all of the valve-and-plunger units 10b–15b and the first and second in-out lines 91b and 92b of adjacent units. Further cross-overs in the system are effected by the five alternate porting type valves of the units 11b–15b. It will be seen that the total of such cross-overs is an odd number. Thus in FIGURE 3, it will be understood that there is a total of five cross-overs effected by using the plungers of the alternate type and that there is a total of six cross-overs effected by crossing the connections between the first and second passages 31b and 32b on the one hand and the first and second in-out lines 91b and 92b on the other hand. Five valve cross-overs and six line cross-overs makes a grand total of an odd number, namely eleven.

Operation of Apparatus of FIGURE 3

The operation of the apparatus of FIGURE 3 can also be followed through similarly to the above-described particularization of the operation of the apparatus of FIGURE 1. With the several valve-and-plunger units in the illustrated positions, the next plunger to move is that of the unit 11b and the first branch passage extension to receive a measure of lubricating fluid is the extension 82b of unit 10b, as indicated by the word "first" in FIGURE 3. The operation of the remainder of the FIGURE 3 divider should be obvious and the order of discharge of lubricant from the several branch passage extensions 81b and 82b are indicated by the words "second" through "twelfth."

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

What is claimed is:

1. A cycling lubricant distributor having a fluid supply header, said distributor comprising a plurality of valve-and-plunger units including at least three valve-and-plunger units of a first type and at least one valve-and-plunger unit of a second type, each unit of each said type having first and second hydraulic piston chambers and a pair of hydraulic pistons each in its own one of said pair of chambers in lubricant sealing sliding relationship with its said own one of said pair of chambers, each said unit including linkage means for linking its said pair of hydraulic pistons for movement together and in hydraulic opposition to each other back and forth between first and second limiting end positions, each said unit also including valve means associated for movement with said linkage means, first, second, third, fourth and fifth valve port means associated with each of said valve means, said first and fifth valve port means being interconnected and said second and fourth valve port means being interconnected when said first limiting end position obtains but not when said second limiting end position obtains, and said first and third valve port means being interconnected and said second and fifth valve port means being interconnected when said second limiting end position obtains but not when said first limiting end position obtains, each said unit having first, second, third and fourth passages communicating with its said first, second, third and fourth valve port means, respectively, first and second in-out lines in each said unit communicating with said first and second piston chambers, respectively, said third and fourth passages constituting the upstream portions of outlet branch passages for guiding measures of lubricating fluid for discharge from said distributor to outlet branch lines, the fifth valve port means of said valve-and-plunger units of said first type comprising a fifth valve port communicating with said fluid supply header, the fifth valve port means of said valve-and-plunger units of said second type comprising a pair of fifth valve ports, a first of said pair of fifth valve ports communicating with said first in-out line, the second of said pair of fifth valve ports communicating with said second in-out line, each of the pairs of passages comprising said first and second passages of each unit being connected with its own pair of in-out lines comprising said first and second in-out lines of another unit, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately connect their said first and second valve port means to their said fifth valve port means when the one of their said first and second piston chambers closest to their said first and second valve port means is filled, any remaining number of said valve means being oppositely arranged; the total of said remaining numbers of connected pairs and valve means equalling an odd number.

2. A cycling lubricant distributor having a fluid supply header, said distributor comprising a plurality of valve-and-plunger units including at least three valve-and-plunger units of a first type and at least one valve-and-plunger unit of a second type, each unit of each said type having first and second hydraulic piston chambers and a pair of hydraulic pistons each in its own one of said pair of chambers in lubricant sealing sliding relationship with its said own one of said pair of chambers, each said unit including linkage means for linking its said pair of hydraulic pistons for movement together and in hydraulic opposition to each other back and forth between first and second limiting end positions, each said unit also including valve means associated for movement with said linkage means, first, second, third, fourth and fifth valve port means associated with each of said valve means, said first and fifth valve port means being interconnected and said second and fourth valve port means being interconnected when said first limiting end position obtains but not when said second limiting end position obtains, and said first and third valve port means being interconnected and said second and fifth valve port means being interconnected when said second limiting end position obtains but not when said first limiting end position obtains, each said unit having first, second, third and fourth passages communicating with its said first, second, third and fourth valve port means, respectively, first and second in-out lines in each said unit communicating with said first and second piston chambers, respectively, said third and fourth passages constituting the upstream portions of outlet branch passages for guiding measures of lubricating fluid for discharge from said distributor to outlet branch lines, the fifth valve port means of said valve-and-plunger units of said first type comprising a fifth valve port communicating with said fluid supply header through a fifth passage defined in said each unit of said first type, one-way flow imposing means in each of said fifth passages, the fifth valve port means of said valve-and-plunger units of said second type comprising a pair of fifth valve ports, a first of said pair of fifth valve ports communicating with said first in-out line, the second of said pair of fifth valve ports communicating with said second in-out line, each of the pairs of passages comprising said first and second passages of each unit being connected with its own pair of in-out lines comprising said first and second in-out lines of another unit, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately connect their said first and second valve port means to their said fifth valve port means when the one of their said first and second piston chambers closest to their said first and second valve port means is filled, any remaining number of said valve means being oppositely arranged; the total of said remaining numbers of connected pairs and valve means equalling an odd number.

3. A cycling lubricant distributor having a fluid supply header, said distributor comprising a plurality of valve-and-plunger units including at least three valve-and-plunger units of a first type and at least one valve-and-plunger unit of a second type, each unit of each said type having first and second hydraulic piston chambers and a pair of hydraulic pistons each in its own one of said pair of chambers in lubricant sealing sliding relationship with its said own one of said pair of chambers, each said unit including linkage means for linking its said pair of hydraulic pistons for movement together and in hydraulic opposition to each other back and forth between first and second limiting end positions, each said unit also including valve means associated for movement with said linkage means, first, second, third, fourth and fifth valve port means associated with each of said valve means, said first and fifth valve port means being interconnected and said second and fourth valve port means being interconnected when said first limiting end position obtains but not when said second limiting end position obtains, and said first and third valve port means being interconnected and said second and fifth valve port means being interconnected when said second limiting end position obtains but not when said first limiting end position obtains, each said unit having first, second, third and fourth passages communicating with its said first, second, third and fourth valve port means, respectively, first and second in-out lines in each said unit communicating with said first and second piston chambers, respectively, said third and fourth passages constituting the upstream portions of outlet branch passages for guiding measures of lubricating fluid for discharge from said distributor to outlet branch lines, the fifth valve port means of said valve-and-plunger units of said first type comprising a fifth valve port communicating with said fluid supply header through a fifth passage defined in said each unit of said first type, one-way flow imposing means in each of said fifth passages, the fifth valve port means of said valve-and-plunger units of said second type comprising a pair of fifth valve ports, a first of said pair of fifth valve ports communicating with said first in-out line, the second of said pair of fifth valve ports communicating with said second in-out line, one-way flow imposing means interposed in the path of communication between each member of said pair of fifth valve ports and the one of said first and second valve port means to which said each member becomes interconnected in the course of the operation of its associated valve-and-plunger unit, each of the pairs of passages comprising said first and second passage of each unit being connected with it own pair of in-out lines comprising said first and second in-out lines of another unit, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately connect their said first and second valve port means to their said fifth valve port means when the one of their said first and second piston chambers closest to their said first and second valve port means is filled, any remaining number of said valve means being oppositely arranged; the total of said remaining numbers of connected pairs and valve means equalling an odd number.

References Cited in the file of this patent
UNITED STATES PATENTS 2,792,911     Harter _______________ May 21, 1957
2,834,433     Higgens _______________ May 13, 1958